(12) United States Patent
Huang et al.

(10) Patent No.: US 12,587,093 B2
(45) Date of Patent: Mar. 24, 2026

(54) POWER APPARATUS WITH ELECTROMAGNETIC INTERFERENCE REDUCTION FUNCTION

(71) Applicant: SENTEC E&E CO., LTD., Taoyuan City (TW)

(72) Inventors: Jason Huang, Taoyuan City (TW); Liang-Yo Chen, Taoyuan City (TW); Pi-Sheng Hsu, Taoyuan City (TW); Chun-Ming Wei, Taoyuan City (TW)

(73) Assignee: SENTEC E&E CO., LTD., Taoyuan City (TW)

( * ) Notice: Subject to any disclaimer, the term of this patent is extended or adjusted under 35 U.S.C. 154(b) by 200 days.

(21) Appl. No.: 18/514,813

(22) Filed: Nov. 20, 2023

(65) Prior Publication Data

US 2024/0178748 A1     May 30, 2024

Related U.S. Application Data

(60) Provisional application No. 63/384,993, filed on Nov. 25, 2022.

(51) Int. Cl.
 *H02M 1/44*      (2007.01)
 *H02M 7/00*      (2006.01)
(52) U.S. Cl.
 CPC ............. *H02M 1/44* (2013.01); *H02M 7/003* (2013.01)
(58) Field of Classification Search
 CPC ..... G06F 1/263; H02M 1/10; H02M 3/33561; H02M 7/003; H02M 1/088; H02M 3/088; H02M 3/1584; H02M 3/1566; H02M 1/084; H02M 3/003; H02M 3/33523; H02M 1/44; H01L 25/112; H01L 25/115; H01L 23/34;

(Continued)

(56) References Cited

U.S. PATENT DOCUMENTS 7,119,437 B2 * 10/2006 Morita .................. H01L 25/072
                                                                            257/691
7,791,208 B2 *  9/2010 Bayerer ............. H05K 7/14329
                                                                            257/776

(Continued)

FOREIGN PATENT DOCUMENTS

CN        111952290 A     11/2020
CN        113767563 A     12/2021

OTHER PUBLICATIONS

Office Action dated Oct. 30, 2024 of the corresponding Taiwan patent application No. 112136262.

(Continued)

*Primary Examiner* — Jeffrey A Gblende

(74) *Attorney, Agent, or Firm* — MUNCY, GEISSLER, OLDS & LOWE, P.C.

(57) ABSTRACT

A power apparatus includes a substrate, a first power circuit, and a second power circuit. The substrate includes a first metallization region, a second metallization region, and a third metallization region which are separated from each other. The first power circuit is electrically connected to the first metallization region and the third metallization region, and is arranged across the second metallization region and fails to be in contact with the second metallization region. The second power circuit is electrically connected to the second metallization region and the third metallization region, and fails to be in contact with the first metallization region.

5 Claims, 5 Drawing Sheets

(58) Field of Classification Search
CPC ... H01L 23/528; H01L 27/088; H01L 29/088; H01L 29/2003; H01L 23/49503; H01L 23/49562; H01L 23/49575; H01L 23/62; H01L 23/072; H01L 23/0248; H01L 29/1033; H01L 29/402; H01L 29/41758; H01R 13/6675; H01R 29/00; H01R 31/065; G09G 3/20; H02K 11/046; H01F 2027/406; H01F 27/30; H01F 41/0246; H05K 7/20927; H05K 2201/10166; H05K 2201/10507; H05K 7/2089
See application file for complete search history.

(56) References Cited

U.S. PATENT DOCUMENTS

| | | | | |
|---|---|---|---|---|
| 8,637,964 | B2 * | 1/2014 | Jones | H01L 25/07 |
| | | | | 257/691 |
| 10,680,523 | B2 * | 6/2020 | Fuhrmann | H03K 17/08148 |
| 2006/0290689 | A1 * | 12/2006 | Grant | H01L 24/49 |
| | | | | 257/734 |

OTHER PUBLICATIONS

Office Action dated Jul. 31, 2024 of the corresponding Taiwan patent application No. 112136262.

* cited by examiner

POWER APPARATUS WITH ELECTROMAGNETIC INTERFERENCE REDUCTION FUNCTION

CROSS-REFERENCE TO RELATED APPLICATION

This patent application claims the benefit of U.S. Provisional Patent Application No. 63/384,993, filed Nov. 25, 2022, which is incorporated by reference herein.

BACKGROUND OF THE DISCLOSURE

Technical Field

The present disclosure relates to a power apparatus, and especially relates to a power apparatus with an electromagnetic interference reduction function.

Description of Related Art

A power module is a common electronic apparatus. The power module may be used in various power conversion fields, such as the DC-to-DC conversion field, the DC-to-AC conversion field, and the AC-to-AC conversion field, so that the power module is very important.

As the rated power of the electrical appliances increases and the complexity of the power module increases, the electromagnetic interference problems caused by the circuit configuration of the power module reduces the efficiency and the reliability of the system. The problem of the electromagnetic interference of the power module is urgently needed to be solved.

SUMMARY OF THE DISCLOSURE

In order to solve the above-mentioned problems, an object of the present disclosure is to provide a power apparatus with an electromagnetic interference reduction function.

In order to solve the above-mentioned problems, another object of the present disclosure is to provide a power apparatus with the electromagnetic interference reduction function.

In order to achieve the object of the present disclosure mentioned above, the power apparatus of the present disclosure includes a substrate, a first power circuit, and a second power circuit. The substrate includes a first metallization region, a second metallization region, and a third metallization region which are arranged sequentially and inwards, wherein the second metallization region is arranged between the first metallization region and the third metallization region. The first power circuit includes a first switching component and a first conductive component which are electrically connected to each other, wherein the first switching component is arranged on the first metallization region, and the first conductive component is arranged across the second metallization region and fails to be in contact with the second metallization region, and one end of the first conductive component is in contact with the first switching component, and the other end of the first conductive component is in contact with the third metallization region, and the first switching component is electrically connected to the third metallization region through the first conductive component. The second power circuit includes a second switching component and a second conductive component which are electrically connected to each other, wherein the second switching component is arranged on the third metallization region, and the second conductive component fails to be in contact with the first metallization region, and one end of the second conductive component is in contact with the second switching component, and the other end of the second conductive component is in contact with the second metallization region, and the second switching component is electrically connected to the second metallization region through the second conductive component.

Moreover, in an embodiment of the power apparatus of the present disclosure mentioned above, the power apparatus includes a plurality of the first power circuits and a plurality of the second power circuits, wherein the first power circuits and the second power circuits are in pairs and are staggered on the substrate.

Moreover, in an embodiment of the power apparatus of the present disclosure mentioned above, the first conductive component and the second conductive component are parallel to each other.

Moreover, in an embodiment of the power apparatus of the present disclosure mentioned above, the power apparatus further includes a first electrode pin and a second electrode pin. The first electrode pin is arranged on the first metallization region. The second electrode pin is arranged on the second metallization region. The first electrode pin includes a plurality of first sub pins. The second electrode pin includes a plurality of second sub pins. The first sub pins and the second sub pins are staggered with each other. The first sub pins are arranged on the first metallization region. The second sub pins are arranged on the second metallization region. The second metallization region is U-shaped.

Moreover, in an embodiment of the power apparatus of the present disclosure mentioned above, the first conductive component is a copper clip, a conductive wire, a ceramic clip, or a chip embedding printed circuit board. The second conductive component is a copper clip, a conductive wire, a ceramic clip, or a chip embedding printed circuit board.

Moreover, in an embodiment of the power apparatus of the present disclosure mentioned above, a plurality of first positions on the first metallization region where the first sub pins are arranged and a plurality of second positions on the second metallization region where the second sub pins are arranged are staggered with each other.

In order to achieve the object of the present disclosure mentioned above, the power apparatus of the present disclosure includes a substrate, a first power circuit, and a second power circuit. The substrate includes a first metallization region, a second metallization region, and a third metallization region which are separated from each other. The first power circuit is electrically connected to the first metallization region and the third metallization region, and is arranged across the second metallization region and fails to be in contact with the second metallization region. The second power circuit is electrically connected to the second metallization region and the third metallization region, and fails to be in contact with the first metallization region.

Moreover, in an embodiment of the power apparatus of the present disclosure mentioned above, the first power circuit includes a first switching component and a first conductive component which are electrically connected to each other. The first switching component is arranged on the first metallization region. The first conductive component is arranged across the second metallization region and fails to be in contact with the second metallization region. One end of the first conductive component is in contact with the first switching component. The other end of the first conductive component is in contact with the third metallization region.

The first switching component is electrically connected to the third metallization region through the first conductive component.

Moreover, in an embodiment of the power apparatus of the present disclosure mentioned above, the second power circuit includes a second switching component and a second conductive component which are electrically connected to each other. The second switching component is arranged on the third metallization region. The second conductive component fails to be in contact with the first metallization region. One end of the second conductive component is in contact with the second switching component. The other end of the second conductive component is in contact with the second metallization region. The second switching component is electrically connected to the second metallization region through the second conductive component.

Moreover, in an embodiment of the power apparatus of the present disclosure mentioned above, the power apparatus includes a plurality of the first power circuits and a plurality of the second power circuits, wherein the first power circuits and the second power circuits are in pairs and are staggered on the substrate. The first conductive component and the second conductive component are parallel to each other.

Moreover, in an embodiment of the power apparatus of the present disclosure mentioned above, the power apparatus further includes a first electrode pin and a second electrode pin. The first electrode pin is arranged on the first metallization region. The second electrode pin is arranged on the second metallization region. The first electrode pin includes a plurality of first sub pins. The second electrode pin includes a plurality of second sub pins. The first sub pins and the second sub pins are staggered with each other. The first sub pins are arranged on the first metallization region. The second sub pins are arranged on the second metallization region. The second metallization region is U-shaped. The first conductive component is a copper clip, a conductive wire, a ceramic clip, or a chip embedding printed circuit board. The second conductive component is a copper clip, a conductive wire, a ceramic clip, or a chip embedding printed circuit board.

Moreover, in an embodiment of the power apparatus of the present disclosure mentioned above, a plurality of first positions on the first metallization region where the first sub pins are arranged and a plurality of second positions on the second metallization region where the second sub pins are arranged are staggered with each other.

The advantage of the present disclosure is to reduce the electromagnetic interferences in the power apparatus (namely, the power module).

Please refer to the detailed descriptions and figures of the present disclosure mentioned below for further understanding technologies, methods, and effects and achieving the predetermined purposes of the present disclosure. Further, the purposes, characteristics, and features of the present disclosure may be more deeply and specifically understood. However, the drawings are provided only for references and descriptions and not intended to limit the scope of the present disclosure.

DETAILED DESCRIPTION

In the present disclosure, numerous specific details are provided, to provide a comprehensive understanding of embodiments of the present disclosure. However, those skilled in the art may understand that the present disclosure may be practiced without one or more of these specific details. In other instances, well-known details are not shown or described to avoid obscuring features of the present disclosure. The technical content and the detailed description of the present disclosure are as follows with reference to the figures.

Figure 1:
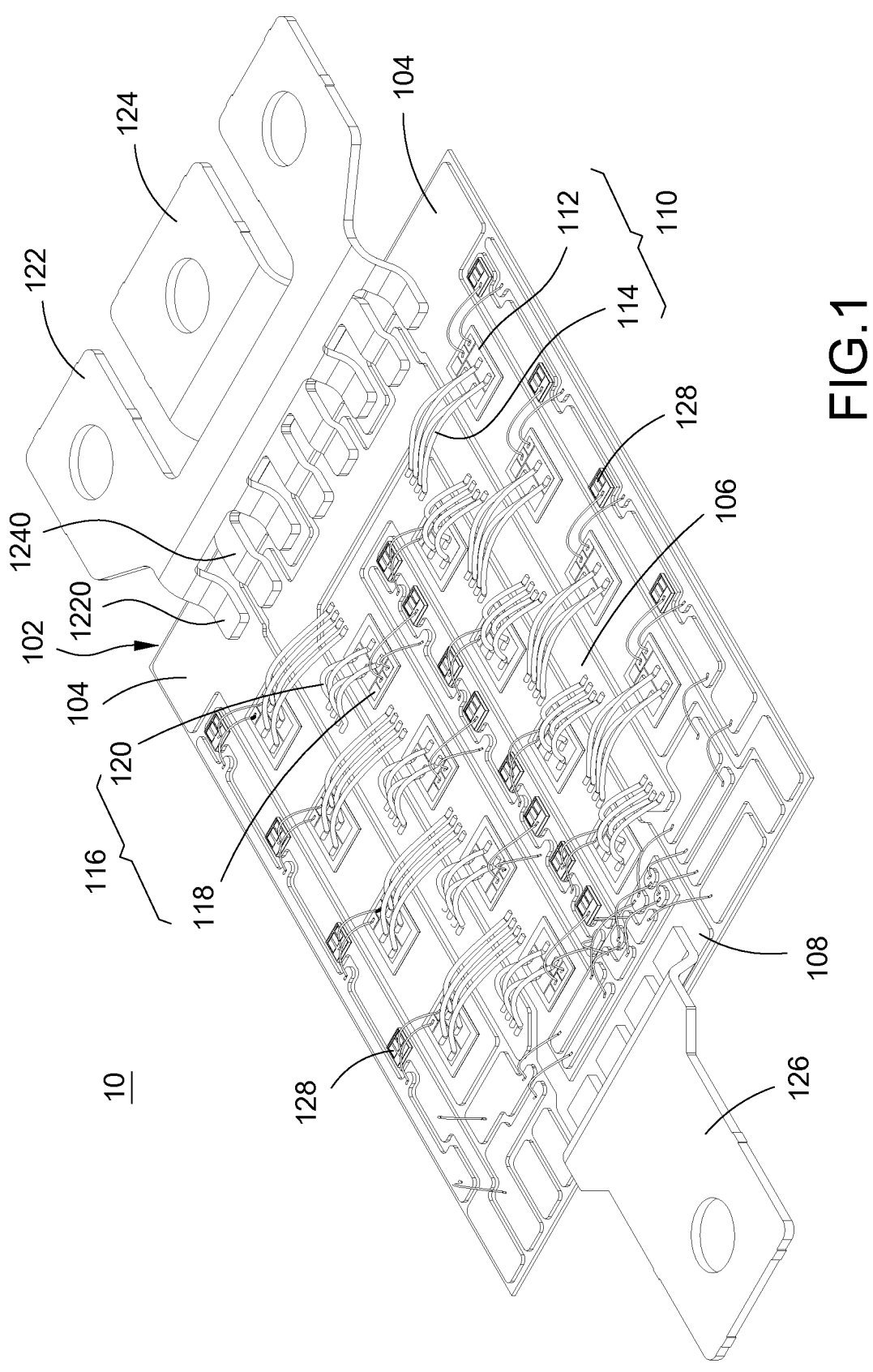
FIG. 1 shows a schematic diagram of the appearance of the power apparatus with an electromagnetic interference reduction function of the present disclosure.
Figure 2:
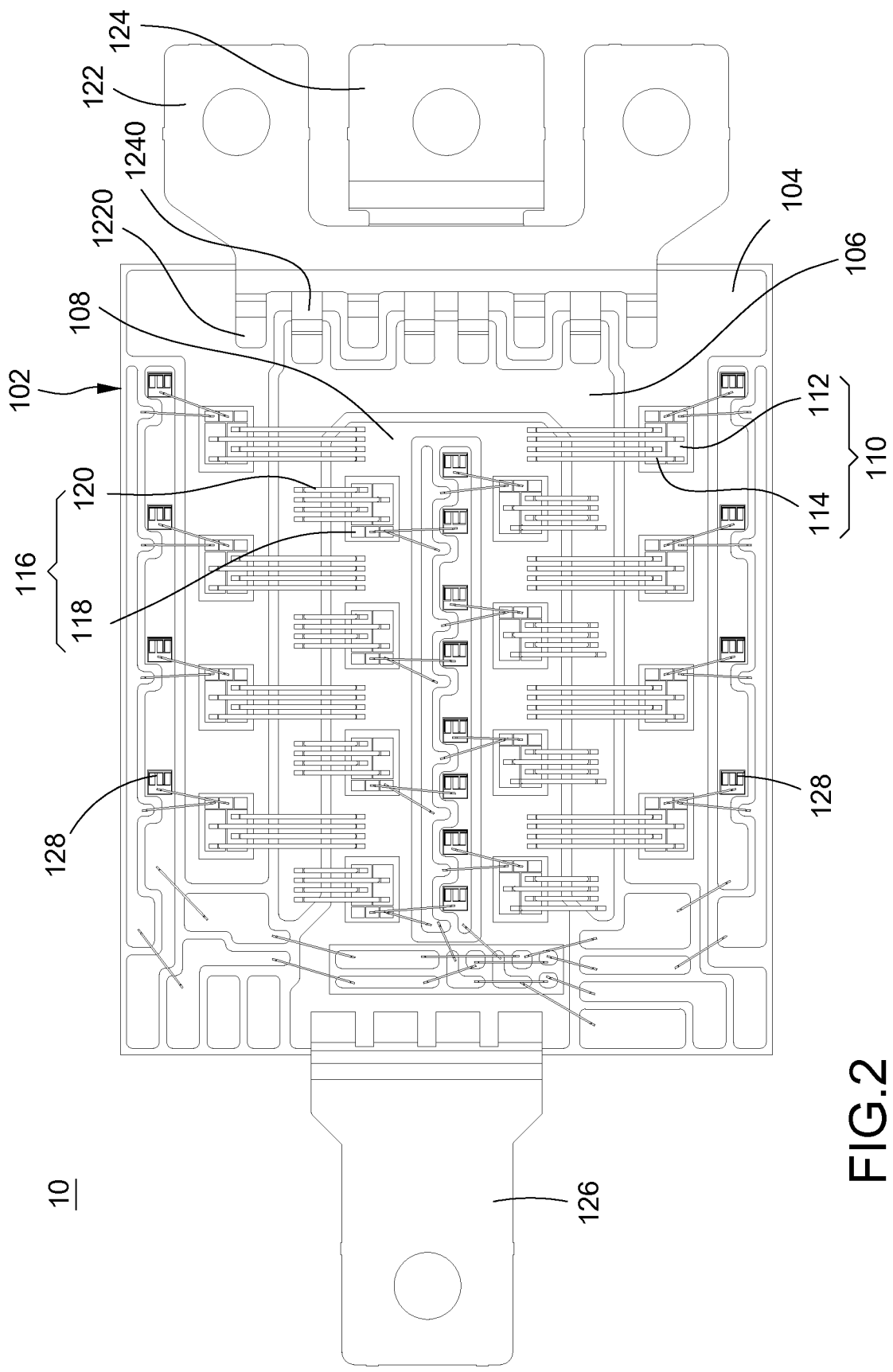
FIG. 2 shows a top view of the power apparatus with the electromagnetic interference reduction function of the present disclosure.
Figure 3:
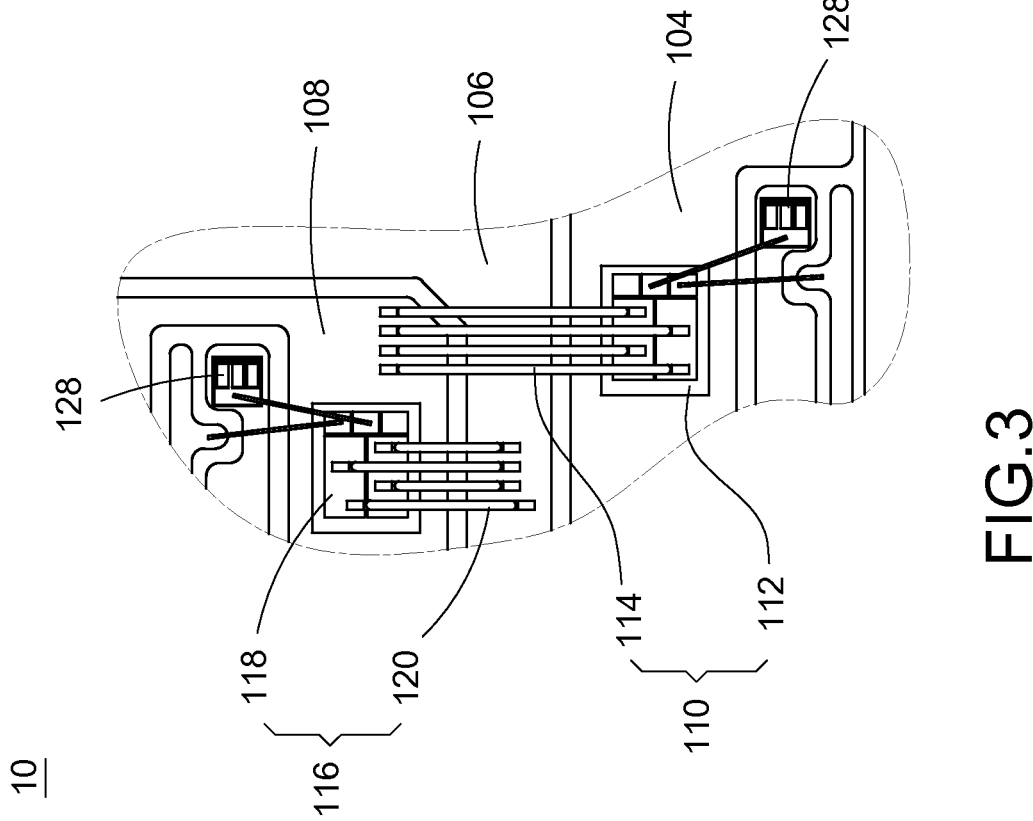
FIG. 3 shows a partial enlarged view of the power apparatus with the electromagnetic interference reduction function of the present disclosure.
Figure 4:
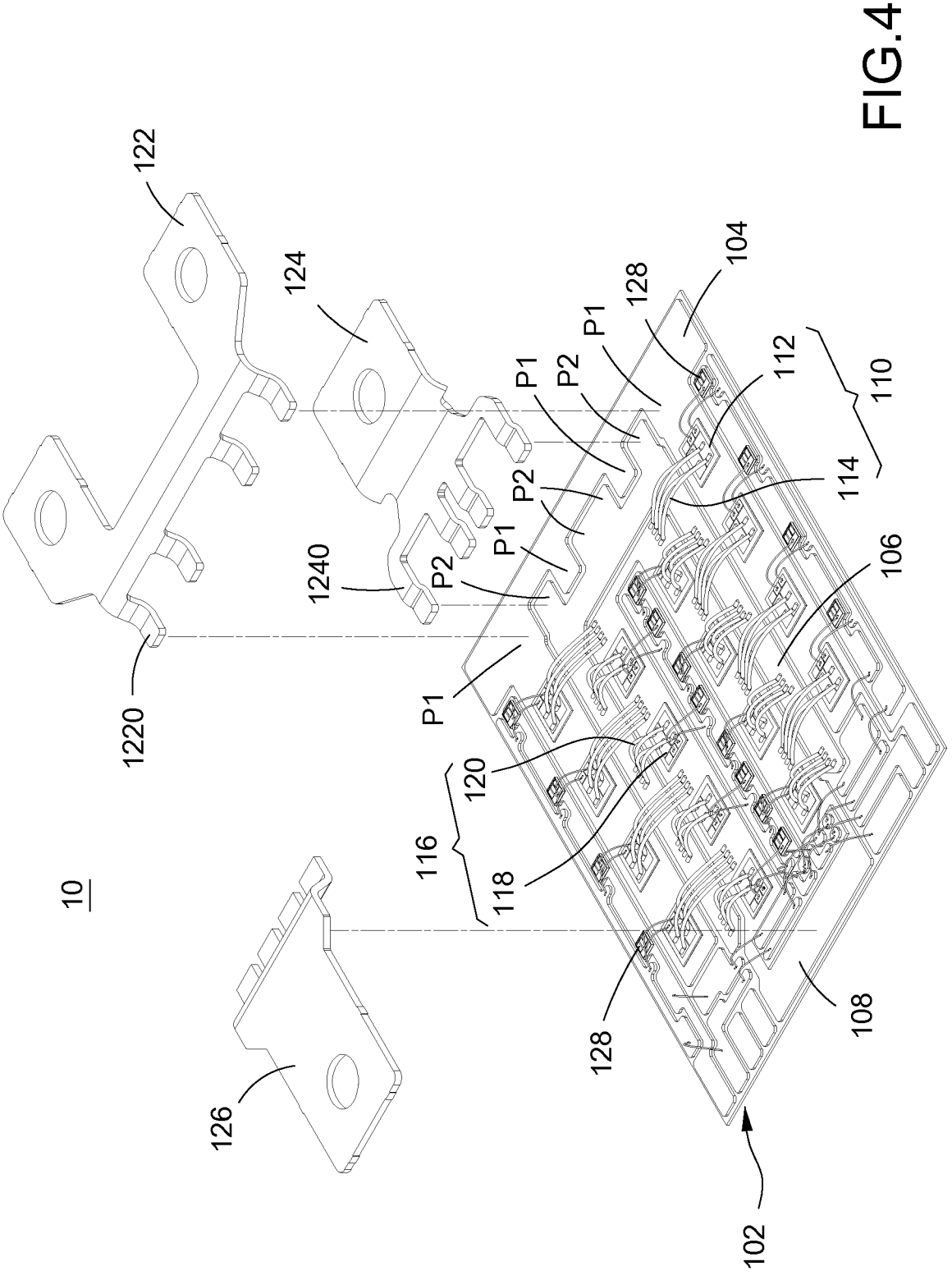
FIG. 4 shows an exploded view of the power apparatus with the electromagnetic interference reduction function of the present disclosure.
Figure 5:
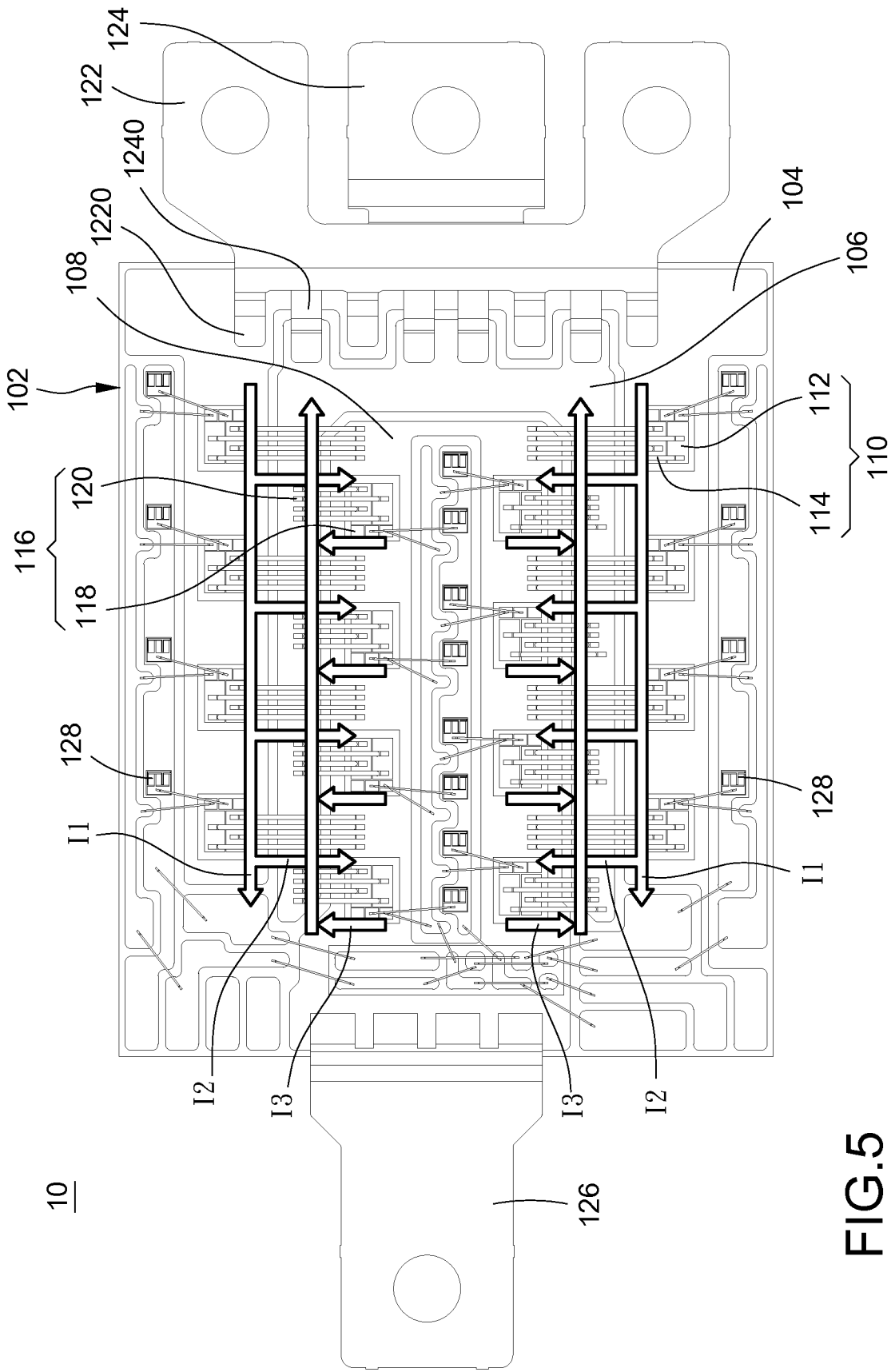
FIG. 5 shows a schematic diagram of current directions of the power apparatus with the electromagnetic interference reduction function of the present disclosure.

FIG. 1 shows a schematic diagram of the appearance of the power apparatus 10 with an electromagnetic interference reduction function of the present disclosure. FIG. 2 shows a top view of the power apparatus 10 with the electromagnetic interference reduction function of the present disclosure. FIG. 3 shows a partial enlarged view of the power apparatus 10 with the electromagnetic interference reduction function of the present disclosure. FIG. 4 shows an exploded view of the power apparatus 10 with the electromagnetic interference reduction function of the present disclosure. FIG. 5 shows a schematic diagram of current directions of the power apparatus 10 with the electromagnetic interference reduction function of the present disclosure. Please refer to FIG. 1 to FIG. 5.

The power apparatus 10 with the electromagnetic interference reduction function of the present disclosure includes a substrate 102, a plurality of first power circuits 116, a plurality of second power circuits 116, a first electrode pin 122 (for example, a voltage positive end electrode pin), and a second electrode pin 124 (for example, a voltage negative end electrode pin). The substrate 102 includes a first metallization region 104, a second metallization region 106, and a third metallization region 108 which are separated from each other and which are arranged sequentially and inwards. The second metallization region 106 is arranged between the first metallization region 104 and the third metallization region 108.

The first power circuit 110 is electrically connected to the first metallization region 104 and the third metallization region 108, and is arranged above/across/over the second metallization region 106, and fails to be directly in contact with the second metallization region 106. The second power circuit 116 is electrically connected to the second metallization region 106 and the third metallization region 108, and fails to be directly in contact with the first metallization region 104. The first electrode pin 122 is arranged on the first metallization region 104. The second electrode pin 124 is arranged on the second metallization region 106.

The first electrode pin 122 includes a plurality of first sub pins 1220. The second electrode pin 124 includes a plurality of second sub pins 1240. The first sub pins 1220 and the second sub pins 1240 are staggered with each other. The first sub pins 1220 are arranged on the first metallization region 104. The second sub pins 1240 are arranged on the second metallization region 106. A plurality of first positions P1 on the first metallization region 104 where the first sub pins 1220 are arranged and a plurality of second positions P2 on the second metallization region 106 where the second sub pins 1240 are arranged are staggered with each other, wherein FIG. 4 clearly shows such staggered relationship.

The first power circuit 110 includes a first switching component 112 and a first conductive component 114 which are electrically connected to each other. The first switching component 112 is arranged on the first metallization region 104. The first conductive component 114 is arranged above/across/over the second metallization region 106, and fails to be directly in contact with the second metallization region 106. One end of the first conductive component 114 is in contact with the first switching component 112. The other end of the first conductive component 114 is in contact with the third metallization region 108. The first switching component 112 is electrically connected to the third metallization region 108 through the first conductive component 114.

The second power circuit 116 includes a second switching component 118 and a second conductive component 120 which are electrically connected to each other. The second switching component 118 is arranged on the third metallization region 108. The second conductive component 120 fails to be directly in contact with the first metallization region 104. One end of the second conductive component 120 is in contact with the second switching component 118. The other end of the second conductive component 120 is in contact with the second metallization region 106. The second switching component 118 is electrically connected to the second metallization region 106 through the second conductive component 120.

The first power circuits 110 and the second power circuits 116 are in pairs (namely, a number of the first power circuits 110 is equal to a number of the second power circuits 116), and are staggered on the substrate 102. The first conductive component 114 and the second conductive component 120 are parallel to each other, or are nearly parallel with an included angle less than 90 degrees. The second metallization region 106 is U-shaped. The first conductive component 114 is a copper clip, a conductive wire, a ceramic clip, or a chip embedding printed circuit board. The second conductive component 120 is a copper clip, a conductive wire, a ceramic clip, or a chip embedding printed circuit board.

The substrate 102 may include sapphire, polyethylene terephthalate (positron emission tomography, usually referred to as PET), bismaleimide triazine resin (also known as BT resin), or ceramic (for example, alumina ($Al_2O_3$)), and other materials. Furthermore, the substrate 102 may be a printed circuit board (usually referred to as PCB), a circuitized ceramic substrate, or a chip leadframe. The power apparatus 10 further includes a heat sink (not shown in the figures) arranged on a bottom surface of the substrate 102 to assist in the heat dissipation of the substrate 102. The heat sink may form a plurality of heat dissipation columns (not shown in the figures) to increase the effective heat dissipation area and enhance the heat dissipation efficiency. The first switching component 112 and the second switching component 118 are, for example but not limited to, transistor switches.

Moreover, a current I1 sequentially flows through the first electrode pin 122, the first metallization region 104, the first switching component 112, the first conductive component 114, the third metallization region 108, the second switching component 118, the second conductive component 120, the second metallization region 106, and the second electrode pin 124. A first direction of a first branch current I2 flowing through the first conductive component 114 and a second direction of a second branch current I3 flowing through the second conductive component 120 are parallel to each other (or nearly parallel with an included angle less than 90 degrees), and are completely opposite to each other. According to Faraday's law of electromagnetic induction, a first magnetic field generated by the first conductive component 114 and a second magnetic field generated by the second conductive component 120 are opposite to each other to offset/cancel/eliminate each other (namely, offset/cancel/eliminate the stray inductance), thereby reducing or eliminating the electromagnetic interference between the first conductive component 114 and the second conductive component 120 as much as possible.

Moreover, the first metallization region 104, the second metallization region 106, and the third metallization region 108 are arranged on a same plane. The first switching components 112 are arranged on the first metallized area 104 along a length direction; namely, the first switching components 112 are linearly arranged on the first metallized area 104. The second switching components 118 are arranged on the third metallization region 108 along the length direction; namely, the second switching components 118 are linearly arranged on the third metallization region 108. The power apparatus 10 further includes a third electrode pin 126 and a plurality of gate resistors 128. The third electrode pin 126 is arranged on the third metallization region 108. The gate resistors 128 are arranged on the substrate 102.

The advantage of the present disclosure is to reduce the electromagnetic interferences in the power apparatus (namely, the power module). The present disclosure is the so-called DC busbar, which transmits the DC power from the DC positive terminal (generally so-called DC+) to the DC negative terminal (generally so-called DC−), wherein DC is the abbreviation of the direct current.

Although the present disclosure has been described with reference to the embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure.

What is claimed is:

1. A power apparatus comprising:
a substrate comprising a first metallization region, a second metallization region, and a third metallization region which are arranged sequentially and inwards, wherein the second metallization region is arranged between the first metallization region and the third metallization region;
a plurality of first power circuits comprising a first switching component and a first conductive component which are electrically connected to each other, wherein the first switching component is arranged on the first metallization region, and the first conductive component is arranged across the second metallization region and fails to be in contact with the second metallization region, and one end of the first conductive component is in contact with the first switching component, and the other end of the first conductive component is in contact with the third metallization region, and the first switching component is electrically connected to the third metallization region through the first conductive component;
a plurality of second power circuits comprising a second switching component and a second conductive component which are electrically connected to each other, wherein the second switching component is arranged on the third metallization region, and the second conductive component fails to be in contact with the first metallization region, and one end of the second conductive component is in contact with the second switching component, and the other end of the second conductive component is in contact with the second metallization region, and the second switching component is electrically connected to the second metallization region through the second conductive component;

a first electrode pin arranged on the first metallization region, the first electrode pin comprising a plurality of first sub pins; and a second electrode pin arranged on the second metallization region, the second electrode pin comprising a plurality of second sub pins, wherein the first power circuits and the second power circuits are in pairs and are staggered on the substrate, wherein the first conductive component and the second conductive component are parallel to each other, and wherein the first sub pins and the second sub pins are staggered with each other, the first sub pins are arranged on the first metallization region, the second sub pins are arranged on the second metallization region, and the second metallization region is U-shaped.

2. The power apparatus of claim 1, wherein the first conductive component is a copper clip, a conductive wire, a ceramic clip, or a chip embedding printed circuit board; the second conductive component is a copper clip, a conductive wire, a ceramic clip, or a chip embedding printed circuit board.

3. The power apparatus of claim 2, wherein a plurality of first positions on the first metallization region where the first sub pins are arranged and a plurality of second positions on the second metallization region where the second sub pins are arranged are staggered with each other.

4. A power apparatus comprising:

a substrate comprising a first metallization region, a second metallization region, and a third metallization region which are separated from each other;

a plurality of first power circuits electrically connected to the first metallization region and the third metallization region, and being arranged across the second metallization region, and failing to be in contact with the second metallization region; and a plurality of second power circuits electrically connected to the second metallization region and the third metallization region, and failing to be in contact with the first metallization region;

a first electrode pin arranged on the first metallization region, the first electrode pin comprising a plurality of first sub pins; and a second electrode pin arranged on the second metallization region, the second electrode pin comprising a plurality of second sub pins, wherein the first power circuits comprise a first switching component and a first conductive component which are electrically connected to each other; the first switching component is arranged on the first metallization region; the first conductive component is arranged across the second metallization region, and fails to be in contact with the second metallization region; one end of the first conductive component is in contact with the first switching component; the other end of the first conductive component is in contact with the third metallization region; the first switching component is electrically connected to the third metallization region through the first conductive component, wherein the second power circuits comprise a second switching component and a second conductive component which are electrically connected to each other; the second switching component is arranged on the third metallization region; the second conductive component fails to be in contact with the first metallization region; one end of the second conductive component is in contact with the second switching component; the other end of the second conductive component is in contact with the second metallization region; the second switching component is electrically connected to the second metallization region through the second conductive component, wherein the first power circuits and the second power circuits are in pairs and are staggered on the substrate; the first conductive component and the second conductive component are parallel to each other, wherein the first sub pins and the second sub pins are staggered with each other, the first sub pins are arranged on the first metallization region, the second sub pins are arranged on the second metallization region, the second metallization region is U-shaped, the first conductive component is a copper clip, a conductive wire, a ceramic clip, or a chip embedding printed circuit board; the second conductive component is a copper clip, a conductive wire, a ceramic clip, or a chip embedding printed circuit board.

5. The power apparatus of claim 4, wherein a plurality of first positions on the first metallization region where the first sub pins are arranged and a plurality of second positions on the second metallization region where the second sub pins are arranged are staggered with each other.

* * * * *